United States Patent [19]
Okazaki et al.

[11] Patent Number: 6,019,388
[45] Date of Patent: Feb. 1, 2000

[54] OCCUPANT PROTECTING DEVICE

[75] Inventors: Hidetsugu Okazaki; Osamu Kyogoku, both of Wako, Japan

[73] Assignee: Honda Giken Kogyo Kabushiki Kaisha, Tokyo, Japan

[21] Appl. No.: 09/159,099

[22] Filed: Sep. 23, 1998

[30]        Foreign Application Priority Data

Sep. 30, 1997  [JP]  Japan .................................. 9-265488

[51] Int. Cl.[7] ................................................ B60R 21/18
[52] U.S. Cl. ............................................................ 280/733
[58] Field of Search ............................................. 280/733

[56]                References Cited

U.S. PATENT DOCUMENTS

| | | | |
|---|---|---|---|
| 3,791,670 | 2/1974 | Lucore et al. | 280/733 |
| 3,801,156 | 4/1974 | Granig | 280/733 |
| 3,877,719 | 4/1975 | Lewis et al. | 280/733 |
| 3,929,348 | 12/1975 | Lawwill | 280/733 |
| 5,393,091 | 2/1995 | Tanaka et al. | 280/733 |
| 5,445,411 | 8/1995 | Kamiyama et al. | 280/733 |
| 5,466,003 | 11/1995 | Tanaka et al. | 280/733 |

*Primary Examiner*—Kenneth R. Rice
*Attorney, Agent, or Firm*—Armstrong, Westerman, Hattori, McLeland, & Naughton

[57]             ABSTRACT

To enhance an external appearance of a buckle-side duct and to prevent the entry of dust into an opening in the buckle-side duct in an occupant protecting device including an expandable bag accommodated within a belt for holding back an occupant upon collision of a vehicle, an outlet opening defined in a tip end of the buckle-side duct and turned outwards of a vehicle body is connected with inlet openings defined in a tip end of a tongue-side duct and turned inwards of the vehicle body. A gas generated by an inflater upon collision of the vehicle is supplied from the buckle-side duct via the tongue-side duct to a shoulder belt to expand the bag accommodated in the shoulder belt. The outlet opening in the buckle-side duct opens sideways away from the occupant sitting in a seat, rather than upwards. Therefore, the outlet opening is not directly visible to the occupant, leading to the enhanced external appearance. Also, when there is no lid in the outlet opening it is difficult for dust to enter through the outlet opening.

2 Claims, 10 Drawing Sheets

OCCUPANT PROTECTING DEVICE

BACKGROUND OF THE INVENTION

1. Technical Field of the Invention

The present invention relates to an occupant protecting device having an expandable bag accommodated within a belt for holding back an occupant upon collision of a vehicle.

2. The Related Art

A known occupant protecting device is disclosed in U.S. Pat. No. 3,791,670, in which, when a tongue mounted on a belt is coupled to a buckle mounted on a seat, a buckle-side duct having a tip end which opens and a tongue-side duct having a tip end which likewise opens are connected rectilinearly to each other, so that a gas generated by an inflater is supplied from the buckle-side duct via the tongue-side duct to the belt.

This known occupant protecting device suffers from a problem in that the tip end of the buckle-side duct opens upwards. When the belt is not put on, the opening is visible directly to the occupant, resulting in a degraded external appearance. In addition, when there is no lid in the opening, dust easily enters into the buckle-side duct.

SUMMARY OF THE INVENTION

The present invention has been accomplished in view of the above circumstance. It is an object of the present invention to enhance the external appearance of the buckle-side duct and to prevent the entry of dust into the opening.

To achieve the above object, according to the present invention, there is provided an occupant protecting device comprising a buckle-side duct integral with a buckle supported on a seat, and a tongue-side duct integral with a tongue supported on a belt, the buckle and the tongue being coupled to each other to connect an inlet opening in the tongue-side duct to an outlet opening in the buckle-side duct, the belt being expanded by supplying a gas generated by an inflater upon collision of a vehicle to the belt through the buckle-side duct and the tongue-side duct, wherein the outlet opening defined in a side of a tip end of the buckle-side duct facing away from an occupant sitting on the seat is connected with the inlet openings defined in a side of a tip end of the tongue-side duct facing toward the occupant sitting on the seat, thereby forming a crank-shaped gas passage.

With the above arrangement, when the belt is not put on, the outlet opening in the buckle-side duct opens sideways opposite from the occupant sitting in a seat, rather than upwards. Therefore, the outlet opening is not directly visible to the occupant, leading to an enhanced external appearance. Also, even when there is no lid in the outlet opening, it is difficult for dust to enter through the outlet opening into the buckle-side duct. Further, even if the inflater should release gas by mistake in a state in which the tongue is not coupled to the buckle, the generated gas can be ejected from the outlet opening in the buckle-side duct in a direction away from the occupant sitting in the seat.

In addition, the buckle is disposed between a pair of bifurcated duct portions of the buckle-side duct, and the tongue is disposed between a pair of bifurcated duct portions of the tongue-side duct.

With the above arrangement, the buckle and the tongue can be disposed compactly within the space surrounded by the buckle-side duct and the tongue-side duct, both of which are formed in a bifurcated shape. Moreover, the gas generated by the inflater flows on laterally opposite sides of the buckle and the tongue through the bifurcated duct portions. Therefore, the moment applied to the buckle and the tongue by the reaction of the gas can be alleviated. In addition, the buckle-side duct and the tongue-side duct are of a symmetrical bifurcated shape and hence, they can be used commonly for a driver's seat and an assistant driver's seat.

BRIEF DESCRIPTION OF THE DRAWINGS

The present invention will now be described by way of a preferred embodiment shown in the accompanying drawings, of which.

DETAILED DESCRIPTION OF THE PREFERRED EMBODIMENT

Figure 1:
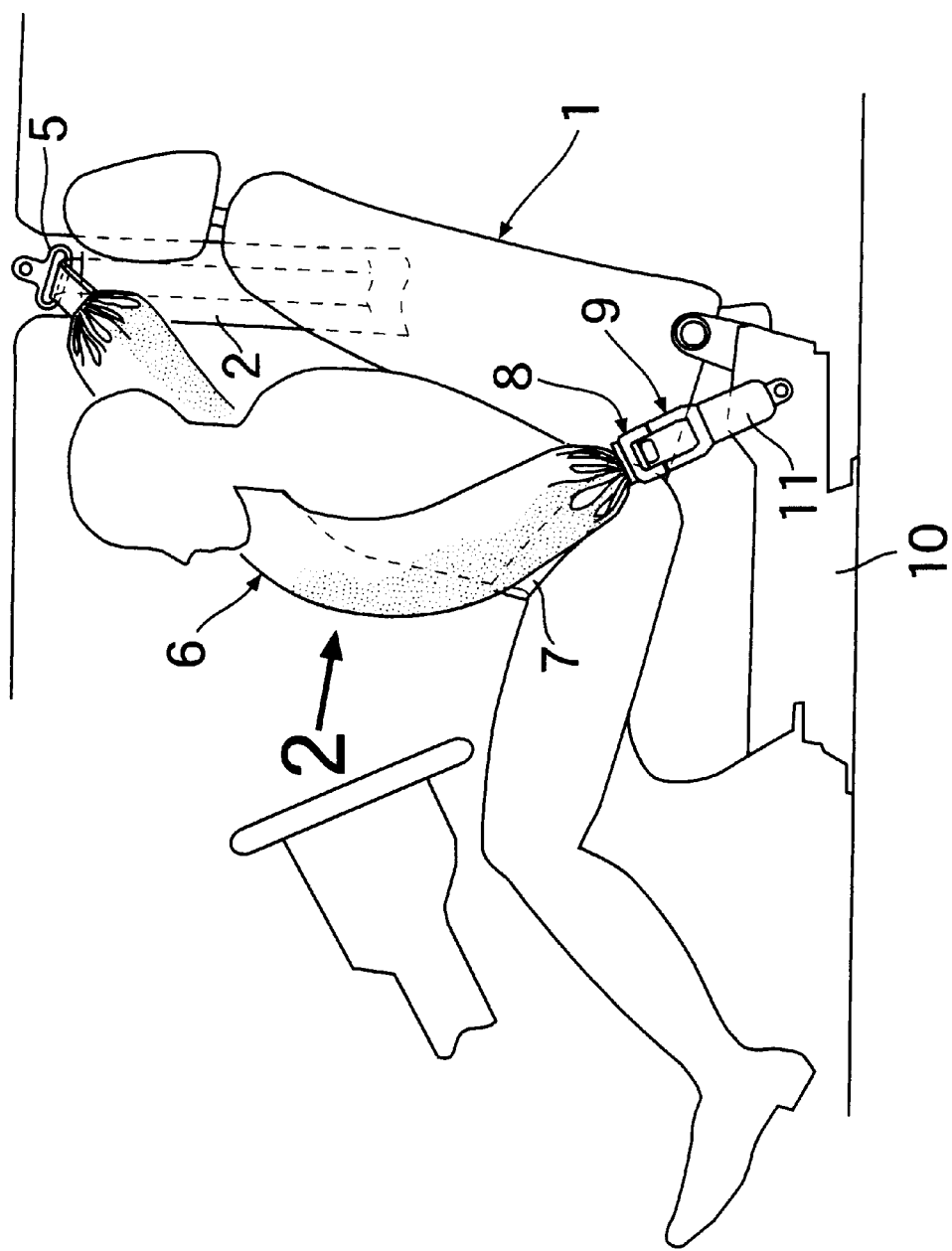
FIG. 1 is a side view of a front seat section of a vehicle.
Figure 2:
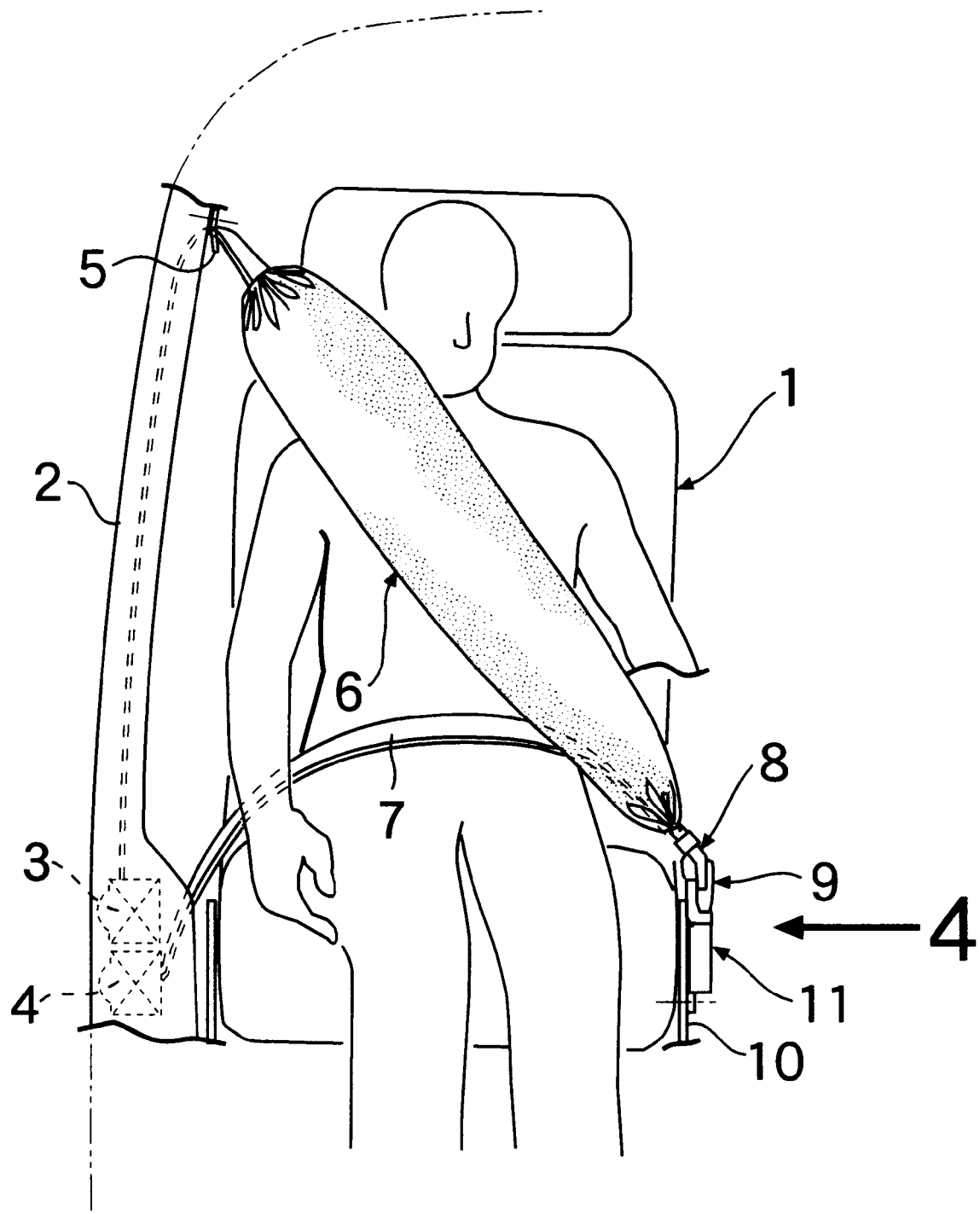
FIG. 2 is a view taken in a direction of an arrow 2 in FIG. 1.
Figure 3:
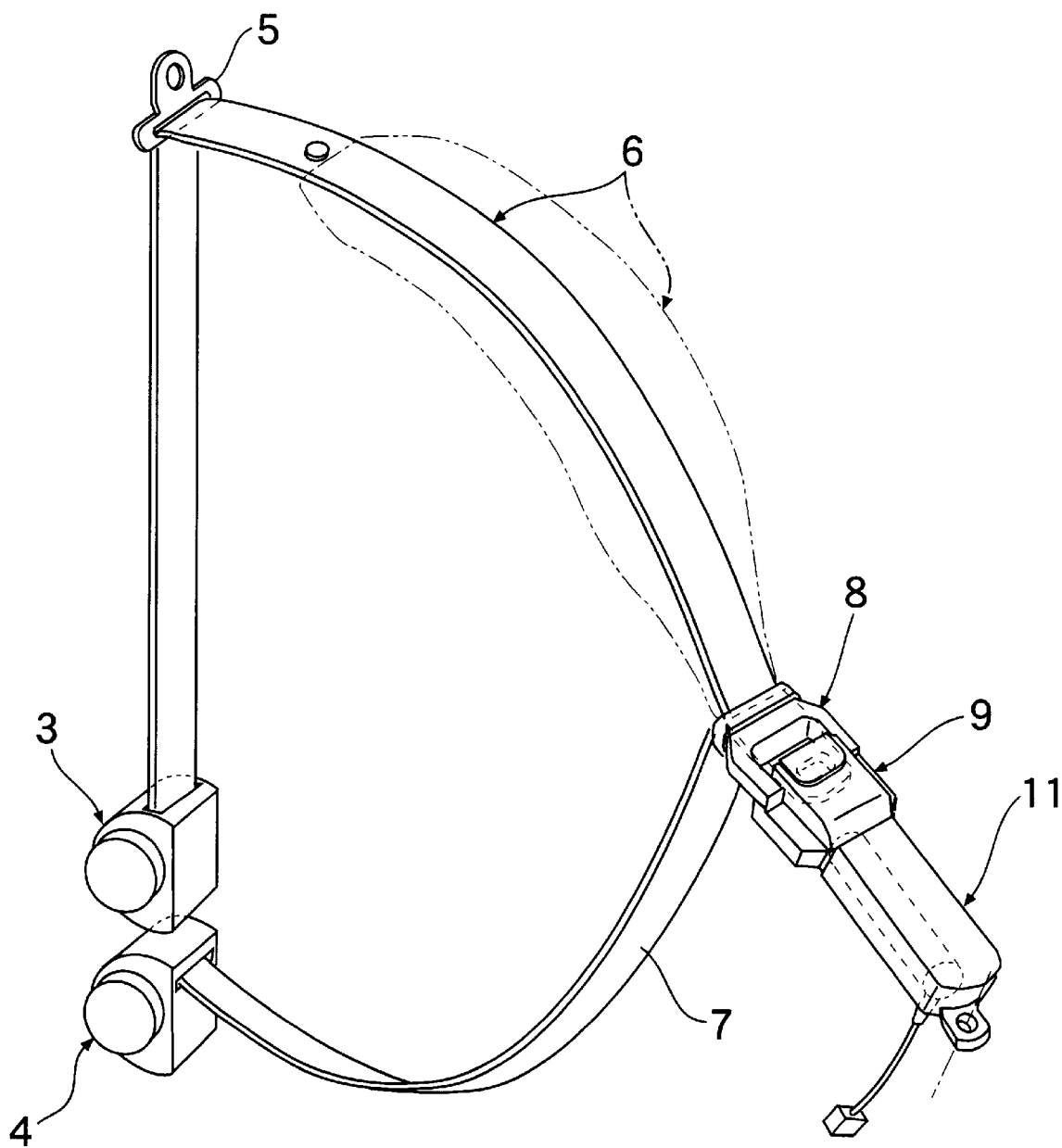
FIG. 3 is a perspective view of an occupant protecting device.

As shown in FIGS. 1 to 3, an occupant protecting device for holding back an occupant (a driver in the embodiment) onto a front right seat 1 includes a shoulder belt retractor 3 mounted at a lower portion of a center pillar 2, a lap belt retractor 4 mounted below the shoulder belt retractor 3, a shoulder belt 6 drawn from the shoulder belt retractor 3 and extending around a slip guide 5 mounted at an upper portion of the center pillar 2, a lap belt 7 drawn from the lap belt retractor 4, a tongue device 8 fixed to ends of the shoulder belt 6 and the lap belt 7, a buckle device 9 to which the tongue device 8 is coupled, and an inflater 11 integral with the buckle device 9 and fixed to a base 10 on the left of and under the seat 1.

The known shoulder belt retractor 3 and lap belt retractor 4 are adapted to drawably take up the shoulder belt 6 and the lap belt 7, respectively, so that in a normal state in which an acceleration sensor (not shown) does not detect an acceleration equal to or larger than a predetermined value, the belts 6 and 7 can be drawn out of the shoulder belt retractor 3 and the lap belt retractor 4 to permit the movement of the occupant's body, and when the acceleration sensor has detected an acceleration equal to or larger than the predetermined value upon collision of a vehicle, the belts 6 and 7 are locked, so that they cannot be drawn out of the shoulder belt retractor 3 and the lap belt retractor 4, thereby holding back the occupant. The known inflater 11 is ignited to generate a high-pressure gas by burning of a propellant, when the acceleration sensor has detected an acceleration equal to or larger than the predetermined value.

Figure 7:
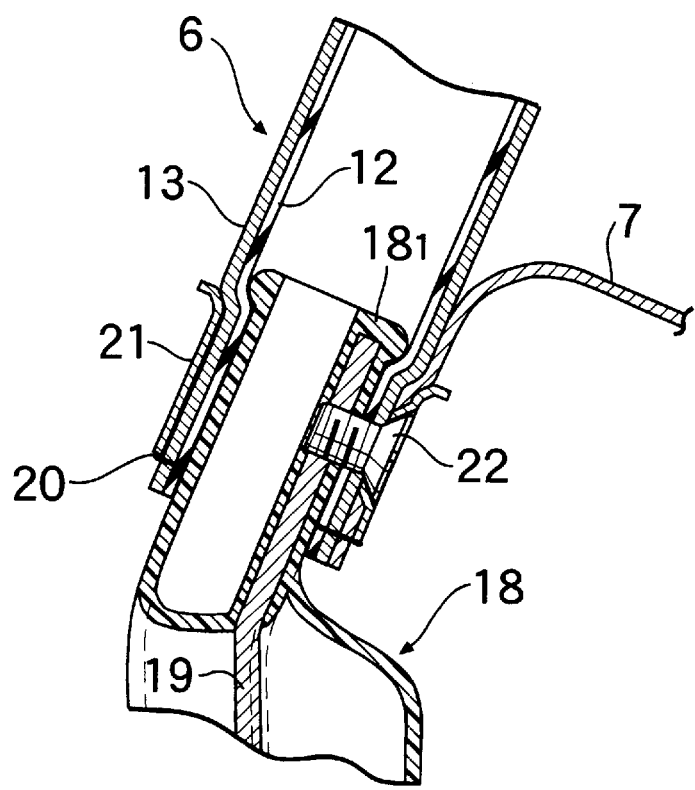
FIG. 7 is a sectional view taken along a line 7—7 in FIG. 4A.

The lap belt 7 includes a plain fabric belt made of a typical synthetic fiber On the other hand, a portion of the shoulder belt 6, which contacts the chest of the occupant, includes a rubber bag 12 formed into a tubular shape, and a cover 13 which covers the outside of the bag 12 (see FIG. 7). The cover 13 formed from a circular knit has a nature that it is easy to expand and shrink radially and difficult to expand and shrink longitudinally. The bag 12 and the cover 13 are normally in flat band-shaped states, but when the high-pressure gas is supplied from the inflater 11 to the bag 12, the bag 12 and the cover 13 are expanded into states shown in FIGS. 1 and 2 to hold back the occupant softly.

Figure 4A:
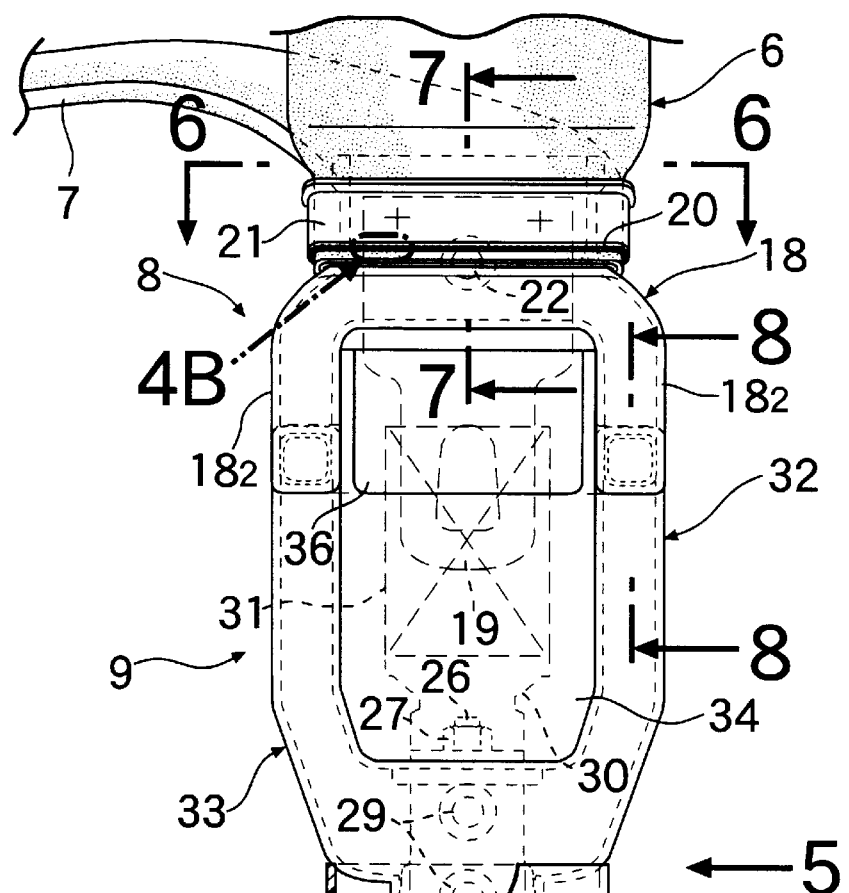
FIGS. 4A and 4B are enlarged views taken in a direction of an arrow 4 in FIG. 2.
Figure 5:
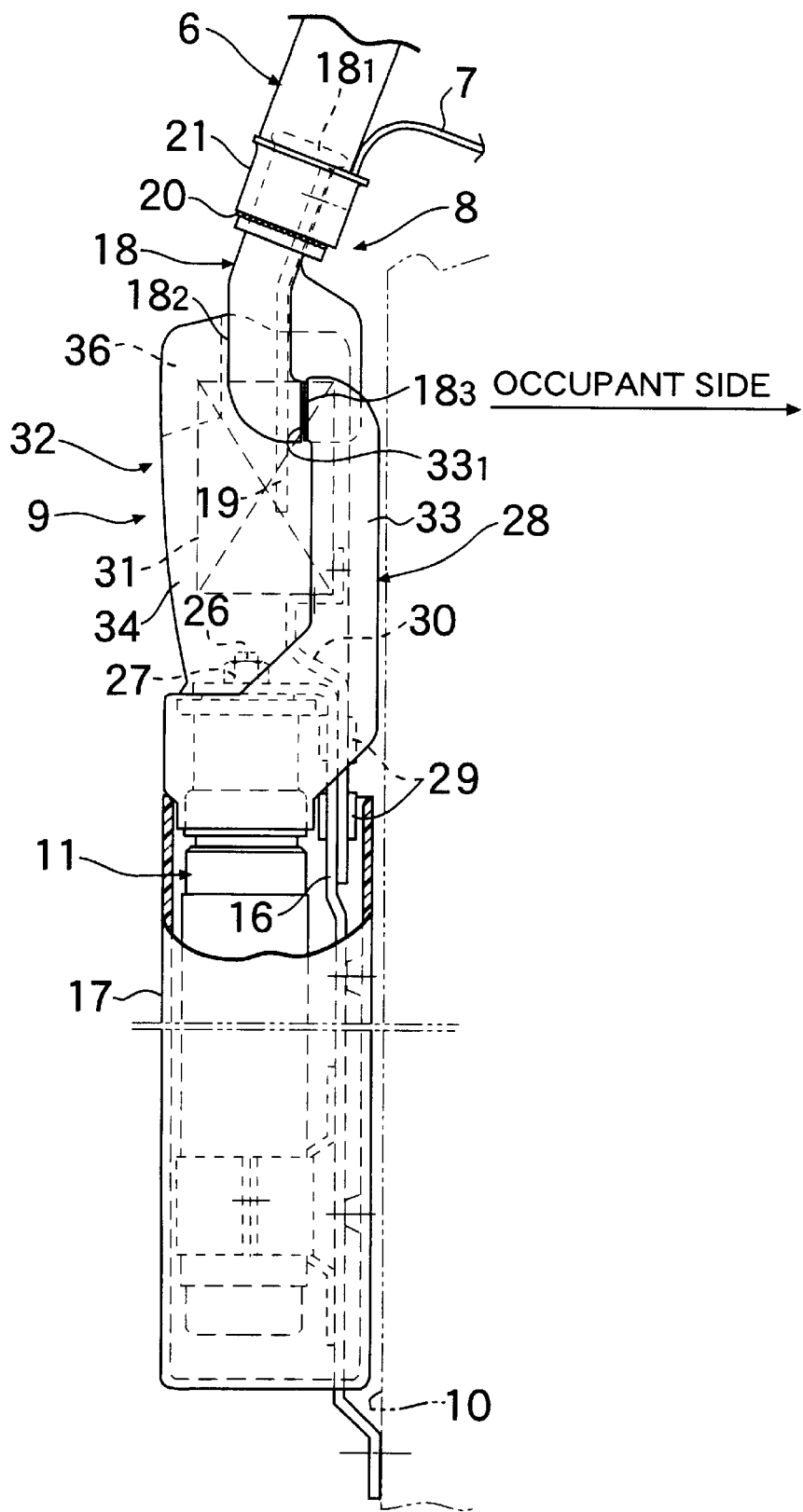
FIG. 5 is a view taken in a direction of an arrow 5 in FIG. 4A.
Figure 6:
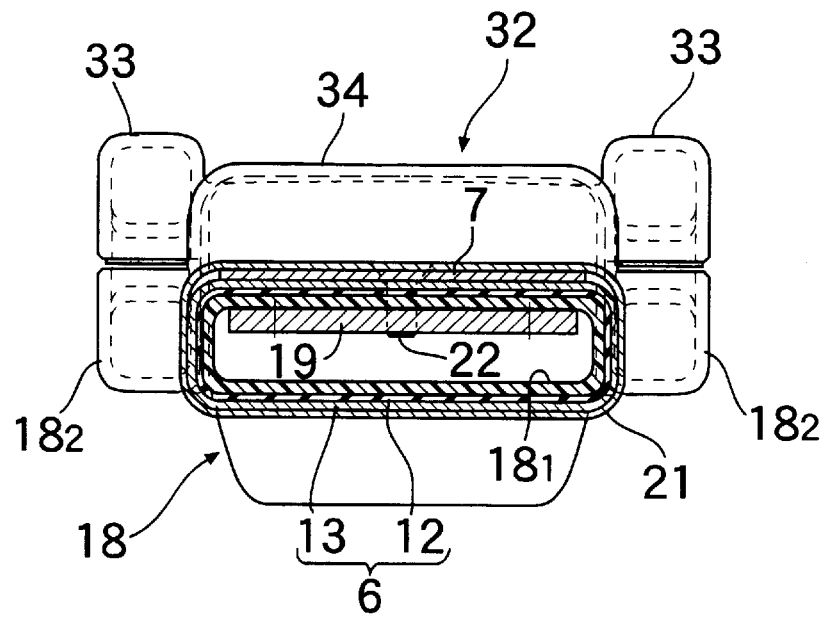
FIG. 6 is a sectional view taken along a line 6—6 in FIG. 4A.

As can be seen from FIGS. 4A and 5, the substantially cylindrical inflater 11 is supported with its axis turned substantially vertically on a bracket 16 fixed to the base 10 on the left of and under the seat 1. The outer periphery of the inflater 11 is covered with an inflater cover 17 made of a synthetic resin.

The structure of the tongue device 8 will be described below with reference to FIGS. 4A to 12.

The tongue device 8 includes a tongue-side bifurcated duct 18 made of a synthetic resin. A tongue 19 made of a metal plate has a base end embedded in a belt coupling portion $18_1$ of the tongue-side duct 18 and extends between a pair of duct portions $18_2$, $18_2$ of the tongue-side duct 18 bifurcated at its tip end. Inlet openings $18_3$, $18_3$ opened inwards laterally of a vehicle body (toward the occupant sitting on the seat 1) are defined in tip ends of the pair of duct portions $18_2$, $18_2$ of the tongue-side duct 18. As can be seen from FIGS. 8 and 10, nine small bores $18_4$ are defined within each of the inlet openings $18_3$, $18_3$ in the tongue-side duct 18, so that the entry of dust or the like can be prevented by the small bores $18_4$, while permitting the supply of the gas into the tongue-side duct 18.

Figure 4B:
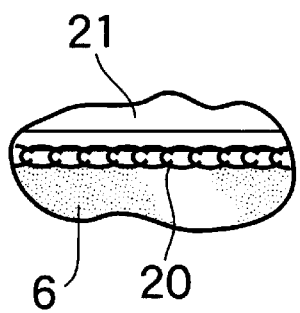

As best shown in FIGS. 4B and 7, the internal and external double superposed ends of the bag 12 and the cover 13 of the shoulder belt 6 are integrally sewn together at a sewing portion 20 formed of chain stitches in a state in which the end of the lap belt 7 has been further superposed onto the outsides of such ends. In a state in which the end of the shoulder belt 6 has been fitted over the outer periphery of the belt-coupling portion $18_1$ of the tongue-side duct 18, a fixing band 21 is fitted over and caulked inwards to the outside of the end of the shoulder belt 6, and a bolt 22 (passed through the fixing band 21, the lap belt 7, the cover 13 and the bag 12) is threadedly inserted into the base end of the tongue 19 embedded in the belt coupling portion $18_1$ of the tongue-side duct 18. Thus, the tongue 19, the tongue-side duct 18, the shoulder belt 6 and the lap belt 7 are integrally coupled together, so that they cannot be separated from one another.

A tensile load applied to the shoulder belt 6 and the lap belt 7 for supporting the chest of the occupant which is intended to move forwards by inertia upon collision of the vehicle, acts so as to withdraw the shoulder belt 6 and the lap belt 7 from the belt coupling portion $18_1$ of the tongue-side duct 18. However, the withdrawal of the shoulder belt 6 and the lap belt 7 is prevented by a stopper function of the sewing portion 20 in addition to a compressing force provided by the caulking of the fixing band 21 and a fastening force of the bolt 22. More specifically, the thread of the sewing portion 20 formed of the chain stitches protrudes from surfaces of the shoulder belt 6 and the lap belt 7. Therefore, the withdrawal of the shoulder belt 6 and the lap belt 7 can be reliably prevented by bringing the sewing portion 20 into contact with an end edge of the fixing band 21 to allow the sewing portion 20 to function as a stopper. The bolt 22 also has a function to firmly couple the tongue 19 and the tongue-side duct 18 to each other.

The structure of the buckle device 9 will be described below with reference to FIGS. 4A to 12.

Figure 12:
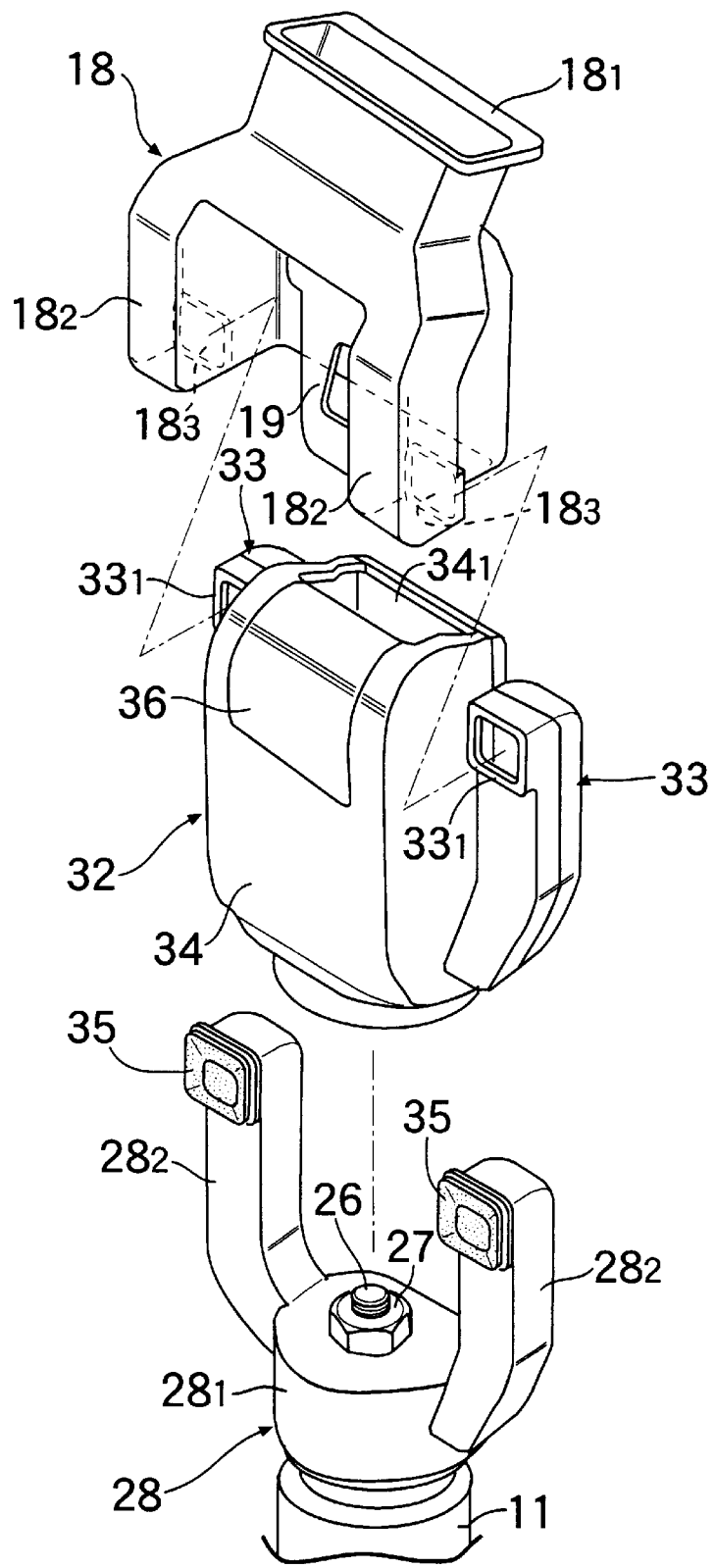
FIG. 12 is an exploded perspective view of the buckle and the tongue.

As can be seen from FIGS. 5 and 12, the buckle device 9 includes a buckle-side duct 28 fixed to a top of the bracket 16 for supporting the inflater 11 by a bolt 26 and a nut 27, and a buckle 31 fixed to a bracket 30 which is coupled to the bracket 16 by rivets 29, 29. The buckle-side duct 28 includes a gas receiving portion $28_1$ connected to surround a gas ejecting portion at an upper end of the inflater 11, and a pair of duct portions $28_2$, $28_2$ bifurcated from the gas receiving portion $28_1$. The buckle-side duct 28 and the buckle 31 are covered with a duct cover 33 and a body cover 34 of a buckle housing 32 made of a synthetic resin, respectively.

Figure 8:
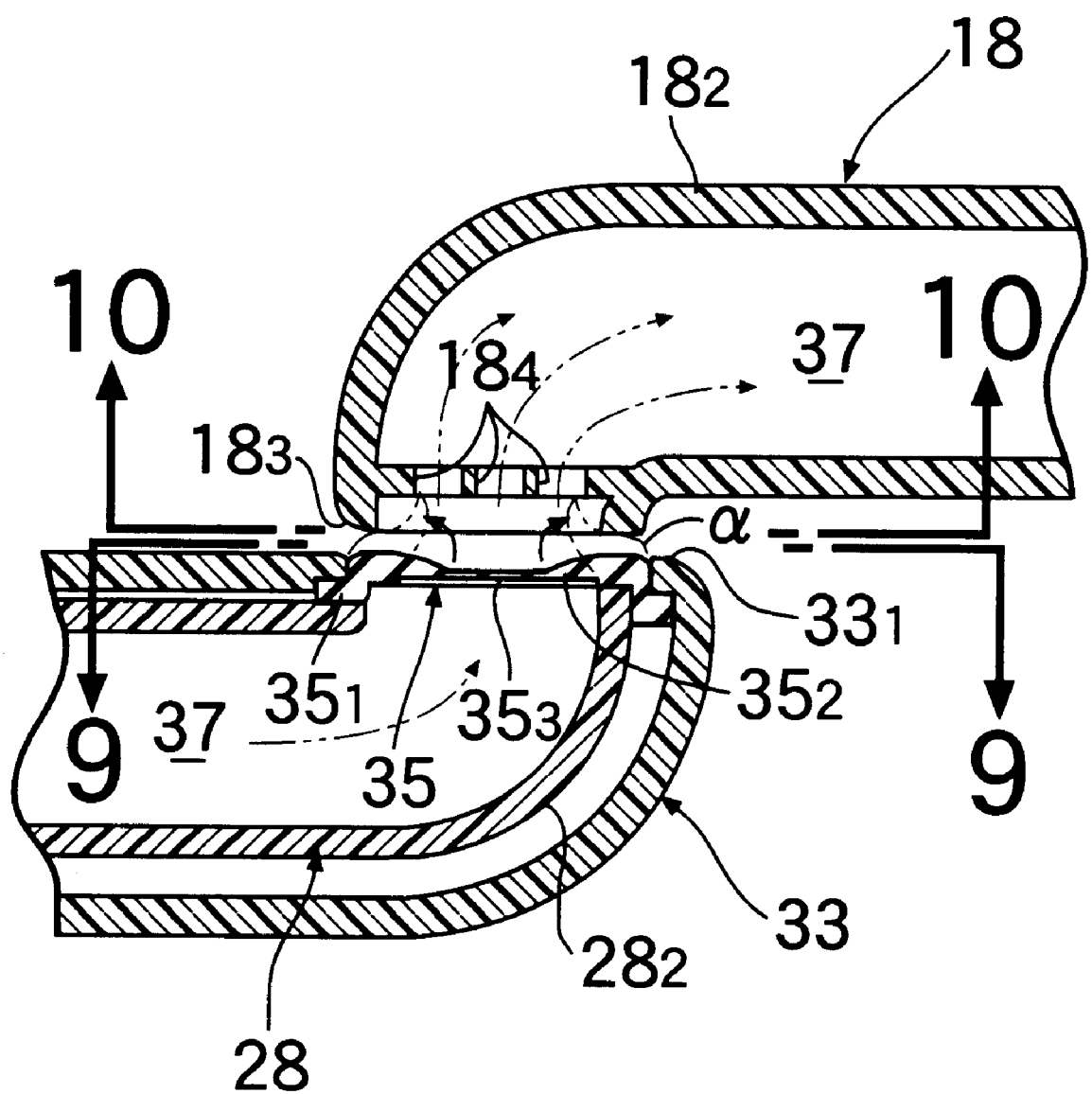
FIG. 8 is a sectional view taken along a line 8—8 in FIG. 4A.
Figure 9:
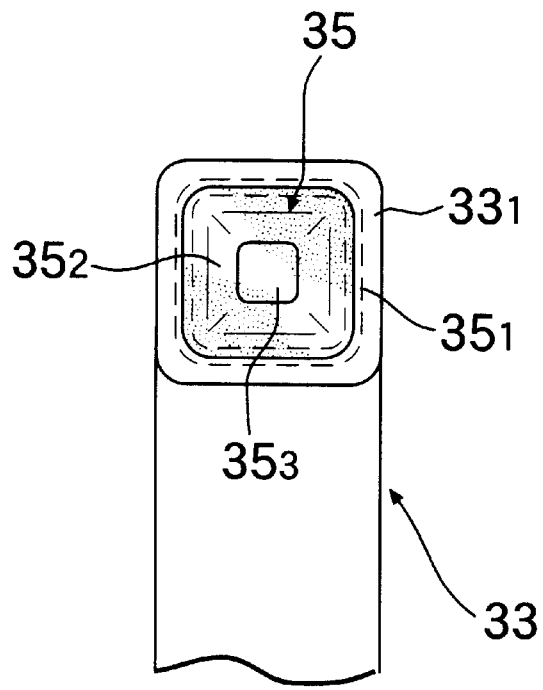
FIG. 9 is a view taken along a line 9—9 in FIG. 8.
Figure 10:
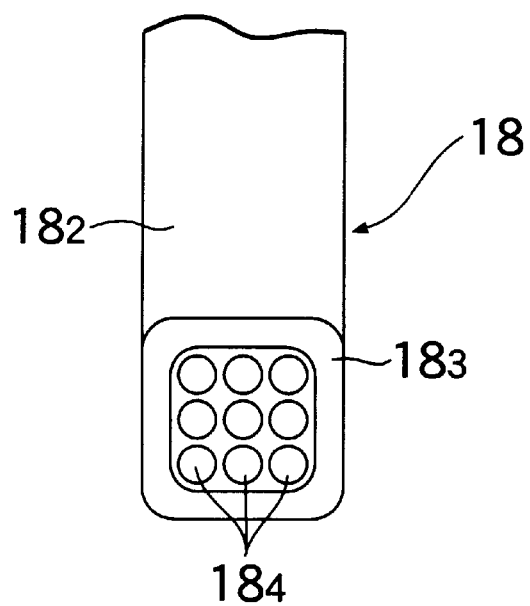
FIG. 10 is a view taken along a line 10—10 in FIG. 8.
Figure 11:
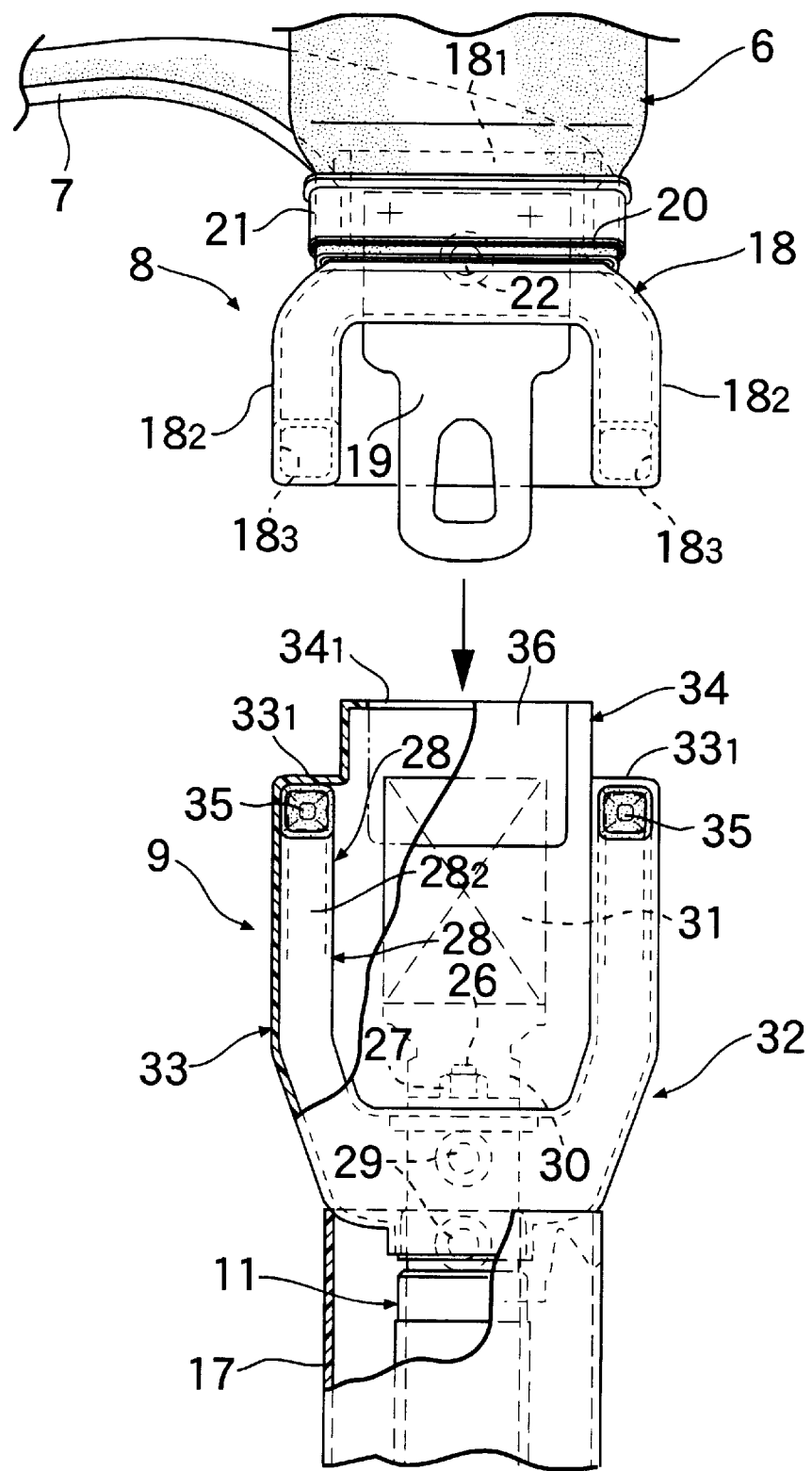
FIG. 11 is a view of a buckle and a tongue which are in separated states.

As can be seen from FIGS. 8 and 9, fixing portions $35_1$, $35_1$ around outer peripheries of seal members 35, 35 made of rubber are clamped and fixed between outlet openings $33_1$, $33_1$ defined at a tip end of the buckle-side duct 28 and at a tip end of the duct cover 33 of the buckle housing 32. The outlet openings $33_1$, $33_1$ are outlet openings for the gas substantially flowing through the buckle-side duct 28, and are turned outwards laterally of the vehicle body (opposite from the occupant sitting in the seat 1). Lip portions $35_2$, $35_2$ with their thickness gradually decreased toward their inner points are formed on peripheral edges of the seal members 35, 35 exposed to the outlet openings $33_1$, $33_1$ and breakable portions $35_3$, $35_3$ each having an extremely small thickness are formed inside the lip portions $35_2$, $35_2$. In a state in which the tongue 19 has been coupled to the buckle 31, the pair of outlet openings $33_1$, $33_1$in the duct cover 33 faced by the seal members 35, 35 are opposed to the pair of inlet openings $18_3$, $18_3$ in the tongue-side duct 18 with a small gap α left therebetween (see FIG. 8). Even in a state in which the tongue-side duct 18 is not coupled to the buckle-side duct 28, the seal members 35, 35 cover the outlet openings $33_1$, $33_1$ in the buckle-side duct 28 and hence, there is not a possibility that dust or the like may enter into the buckle-side duct 28 through the outlet openings $33_1$, $33_1$.

As can be seen from FIG. 12, the body cover 34 of the buckle housing 32 has a tongue inserting opening $34_1$ through which the tongue 19 is inserted into the buckle 31. A release button 36 for releasing the tongue 19 coupled to the buckle 31 is mounted on the body cover 34 in the vicinity of the tongue inserting opening $34_1$.

When the tongue 19 is coupled to the buckle 31, the outlet openings $33_1$, $33_1$ provided at the tip end of the buckle-side duct 28 and the inlet openings $18_3$, $18_3$ provided at the tip end of the tongue-side duct 18 are opposed to each other, and a gas passage 37 (see FIG. 8) bent into a crank-like shape is defined within the buckle-side duct 28 and the tongue-side duct 18. In addition, the buckle-side duct 28 and the tongue-side duct 18 are of a symmetric bifurcated shape and hence, they can be used commonly for a driver's seat and an assistant driver's seat, leading to a decrease in number of types of parts. Moreover, by the buckle 31 and the tongue 19 being disposed in spaces surrounded by the bifurcated buckle-side duct 28 and the likewise bifurcated tongue-side duct 18, the buckle device 9 and the tongue device 8 can be formed compactly.

The operation of the embodiment of the present invention having the above-described arrangement will be described below.

When the occupant sits down on the seat 1 and couples the tongue 19 of the tongue device 8 to the buckle 31 of the buckle device 9, the outlet openings $33_1$, $33_1$ in the buckle-side duct 28 are opposed to the inlet openings $18_3$, $18_3$ in the tongue-side duct 18, with the small gap α left therebetween. When the gas generated by the inflater 11 upon collision of the vehicle is supplied to the buckle-side duct 28, the breakable portions $35_3$, $35_3$ of the seal members 35, 35 closing the outlet openings $33_1$, $33_1$ in the buckle-side duct 28 are broken by a pressure of the gas, and the lip portions $35_2$, $35_2$ are flexed toward the tongue-side duct 18 into close contact with the inlet openings $18_3$, $18_3$ (see dashed lines in FIG. 8). This causes the outlet openings $33_1$, $33_1$ in the buckle-side duct 28 and the inlet openings $18_3$, $18_3$ in the tongue-side duct 18 to be connected in a gas-tight manner, so that the gas generated by the inflater 11 is supplied through the buckle-side duct 28 and the tongue-side duct 18 into the bag 12 of the shoulder belt 6. As a result, the shoulder belt 6 is expanded to softly hold back the occupant's chest. At this time, the gas generated by the inflater 11 flows symmetrically through the bifurcated duct portions $28_2$, $28_2$ of the buckle-side duct 28 and the bifurcated duct portions $18_2$, $18_2$ of the tongue-side duct 18, and hence, the moment applied to the buckle device 9 and the tongue device 8 by the reaction of the gas can be alleviated.

When the inflater 11 has stopped the generation of the gas, the lip portions $35_2$, $35_2$ of the seal members 35, 35 leave the inlet openings $18_3$, $18_3$ in the tongue-side duct 18 by their own elasticity. Therefore, the gap α a between the outlet openings $33_1$, $33_1$ and the inlet openings $18_3$, $18_3$ is opened. Usually, a vent hole is defined in the bag 12, and the shock applied to the occupant is weakened by the escaping gas through the vent hole after completion of the expansion of the bag 12. However, if the gas is escaped through the gap α, the vent hole can be omitted to reduce the cost.

As described above, when the tongue 19 is to be coupled to the buckle 31 to connect the tongue-side duct 18 to the buckle-side duct 28, it is unnecessary to bring the inlet openings $18_3$, $18_3$ in the tongue-side duct 18 and the outlet openings $33_1$, $33_1$ in the buckle-side duct 28 into gas-tight contact with each other through the seal members 35, 35. Therefore, it is possible not only to smoothly perform the attachment and detachment of the tongue 19 and the buckle 31 without being obstructed by the seal members 35, 35, but also to prevent the damage of the seal members 35, 35 due to friction.

Moreover, when the occupant protecting device is not mounted, the outlet openings $33_1$, $33_1$ in the buckle-side duct 28 open opposite from the occupant sitting on the seat 1 (outwards laterally of the vehicle body). Therefore, the outlet openings $33_1$, $33_1$ are not directly visible to the occupant, leading to an enhanced external appearance. If the buckle-side duct 28 has no seal members 35, 35, then there is a possibility that dust or the like may enter the buckle-side duct 28 through the outlet openings $33_1$, $33_1$. However, since the outlet openings $33_1$, $33_1$ open sideways rather than upwards, it is difficult for dust or the like to enter.

Further, even if the inflater 11 generates the gas in a state in which the tongue 19 is not coupled to the buckle 31, the gas cannot be ejected toward the occupant, because the outlet openings $33_1$, $33_1$ in the buckle-side duct 28 are turned away opposite from the occupant.

Although the embodiment of the present invention has been described in detail, it will be understood that the present invention is not limited to the above-described embodiment, and various modifications may be made without departing from the subject matter of the present invention.

For example, the inflater 11 has been mounted integrally with the buckle 31 in the embodiment, but they may be mounted separately.

As discussed above, according to the present invention, when the belt is not put on, the outlet opening in the buckle-side duct opens sideways away from the occupant sitting in a seat, rather than upwards. Therefore, the outlet opening is not directly visible to the occupant, leading to an enhanced external appearance. Even when there is no lid in the outlet opening, it is difficult for dust to enter through the outlet opening into the buckle-side duct. Further, even if the inflater should release gas by mistake in a state in which the tongue is not coupled to the buckle, the generated gas can be ejected from the outlet opening in the buckle-side duct in a direction away from the occupant sitting in the seat.

According to the present invention, the buckle and the tongue can be disposed compactly within the spaces surrounded by the buckle-side duct and the tongue-side duct, both of which are formed in a bifurcated shape. Moreover, the gas generated by the inflater flows on the laterally opposite sides of the buckle and the tongue through the bifurcated duct portions. Therefore, the moment applied to the buckle and the tongue by the reaction of the gas can be alleviated. In addition, the buckle-side duct and the tongue-side duct are of the symmetrical bifurcated shape and hence, they can be used commonly for the driver's seat and the assistant driver's seat.

What is claimed is:

1. An occupant protecting device for an occupant sitting in a seat of a vehicle, said occupant protecting device comprising:

a buckle supported in the seat;

a buckle-side duct connected to said buckle, said buckle-side duct having an outlet opening on a tip end of said buckle-side duct, said outlet opening facing away from the occupant;

a belt expandable upon collision of the vehicle;

a tongue supported on said belt;

a tongue-side duct connected to said tongue, said tongue-side duct having an inlet opening on a tip end of said tongue-side duct, said inlet opening facing toward the occupant, said tongue-side duct and said buckle-side duct forming a crank-shaped gas passage for expansion of said belt with said inlet opening of said tongue-side duct facing said outlet opening of said buckle-side duct when said tongue is coupled to said buckle.

2. An occupant protecting device according to claim 1, wherein said buckle-side duct has a pair of bifurcated duct portions, each of said duct portions having said tip end with said outlet opening, said buckle being disposed in a first space between said bifurcated duct portions of said buckle-side duct, and wherein said tongue-side duct has a pair of bifurcated duct portions, each of said duct portions having said tip end with said inlet opening, said tongue being disposed in a second space between said bifurcated duct portions of said tongue-side duct.

* * * * *